(12) United States Patent
Deferme (10) Patent No.: US 11,761,507 B2
(45) Date of Patent: Sep. 19, 2023

(54) WEIGHT OPTIMIZED BELLOW ACCUMULATOR

(71) Applicant: DRiV Automotive Inc., Lake Forest, IL (US)

(72) Inventor: Stefan Deferme, Heusden-Zolder (BE)

(73) Assignee: DRiV Automotive Inc., Lake Forest, IL (US)

( * ) Notice: Subject to any disclaimer, the term of this patent is extended or adjusted under 35 U.S.C. 154(b) by 264 days.

(21) Appl. No.: 17/172,837

(22) Filed: Feb. 10, 2021

(65) Prior Publication Data

US 2022/0252125 A1    Aug. 11, 2022

(51) Int. Cl.
*F16F 9/096* (2006.01)
*F16F 9/06* (2006.01)
(Continued)

(52) U.S. Cl.
CPC .............. *F16F 9/096* (2013.01); *F16F 9/061* (2013.01); *F16F 9/062* (2013.01); *F16F 9/065* (2013.01);
(Continued)

(58) Field of Classification Search
CPC .. F16F 9/096; F16F 9/061; F16F 9/062; F16F 9/065; F16F 9/46; F16F 2222/12; F16F 2224/0208; F16F 2228/066; F16F 2230/30; F16F 2232/08; F16F 2234/02; F16F 9/56; F16F 1/121; B60G 13/08; B60G 17/08;
(Continued)

(56) References Cited

U.S. PATENT DOCUMENTS 3,105,574 A * 10/1963 Frenzel .................... F16F 9/52
                                                      188/269
3,410,549 A * 11/1968 Cheak .................... B60G 15/12
                                                     267/64.23
(Continued)

FOREIGN PATENT DOCUMENTS

DE          10306146         8/2004
EP          0958454          6/2003
(Continued)

OTHER PUBLICATIONS

European Search Report issued in corresponding EP Application 22155768, dated Jul. 4, 2022.

*Primary Examiner* — Thomas J Williams
*Assistant Examiner* — James K Hsiao
(74) *Attorney, Agent, or Firm* — Burris Law, PLLC (57) ABSTRACT

A damper assembly includes a damper with a pressure tube and a piston slidably disposed within the pressure tube. A first working chamber is defined on one side of the piston and a second working chamber is defined on an opposite side of the piston such that a volume of the second working chamber decreases during a compression stroke of the piston and the volume of the second working chamber increases during a rebound stroke of the piston. A bellow accumulator assembly is included and in fluid communication with the second working chamber. The bellow accumulator assembly includes a housing, a bellow accumulator disposed within the housing, a pressurized gas chamber defined between the housing and the bellow accumulator and an accumulator chamber defined between the bellow accumulator and the second working chamber.

16 Claims, 5 Drawing Sheets

(51) Int. Cl.
  *F16F 9/46* (2006.01)
  *B60G 13/08* (2006.01)
  *B60G 17/08* (2006.01)

(52) U.S. Cl.
  CPC ............... *F16F 9/46* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2206/7102* (2013.01); *B60G 2206/72* (2013.01); *B60G 2500/11* (2013.01); *B60G 2800/162* (2013.01); *F16F 2222/12* (2013.01); *F16F 2224/0208* (2013.01); *F16F 2228/066* (2013.01); *F16F 2230/0005* (2013.01); *F16F 2230/30* (2013.01); *F16F 2232/08* (2013.01); *F16F 2234/02* (2013.01)

(58) Field of Classification Search
  CPC ............ B60G 2202/04; B60G 1104/62; B60G 2206/41; B60G 2206/7102; B60G 2206/72; B60G 2500/11; B60G 2800/162; B60G 2500/30
  See application file for complete search history.

(56) References Cited

U.S. PATENT DOCUMENTS

| | | | | |
|---|---|---|---|---|
| 3,469,661 | A * | 9/1969 | Lohr | B60G 15/14 188/269 |
| 3,714,964 | A * | 2/1973 | Livingston | F15B 1/103 137/72 |
| 3,945,626 | A * | 3/1976 | Tilkens | B60G 17/04 188/274 |
| 3,955,807 | A * | 5/1976 | Takahashi | B60G 11/62 267/64.23 |
| 4,010,829 | A * | 3/1977 | Naito | B60G 17/08 188/278 |
| 4,132,395 | A * | 1/1979 | Fox, Jr. | F16F 9/088 188/269 |
| 4,206,908 | A * | 6/1980 | Mercier | F16F 9/088 138/30 |
| 4,234,172 | A * | 11/1980 | Takahashi | F16F 9/54 267/152 |
| 4,311,302 | A * | 1/1982 | Heyer | F16F 9/096 188/322.22 |
| 4,321,949 | A | 3/1982 | Mercier | |
| 4,491,207 | A * | 1/1985 | Boonchanta | B60G 17/08 188/266.5 |
| 4,614,255 | A * | 9/1986 | Morita | F16F 9/088 188/315 |
| 4,720,085 | A * | 1/1988 | Shinbori | F16F 9/46 188/266.5 |
| 4,746,106 | A * | 5/1988 | Fukumura | F16F 9/468 267/64.22 |
| 4,813,519 | A * | 3/1989 | Matsubara | F16F 9/096 267/64.15 |
| 4,828,231 | A * | 5/1989 | Fukumura | F16F 9/088 267/64.19 |
| 4,858,898 | A * | 8/1989 | Niikura | F16F 9/43 267/218 |
| 4,880,213 | A * | 11/1989 | Shinbori | F16F 9/088 92/48 |
| 4,890,822 | A | 1/1990 | Ezure et al. | |
| 4,921,227 | A * | 5/1990 | Fukumura | F16F 9/088 267/64.23 |
| 4,958,706 | A * | 9/1990 | Richardson | F16F 9/512 188/319.1 |
| 4,997,009 | A * | 3/1991 | Niikura | B60G 17/0424 138/30 |
| 5,042,781 | A * | 8/1991 | Ezure | F16F 9/096 267/64.23 |
| 5,098,263 | A * | 3/1992 | Hattori | F16L 55/053 417/540 |
| 6,003,555 | A * | 12/1999 | Sheng | G05D 16/0619 138/30 |
| 6,478,051 | B1 * | 11/2002 | Drumm | F15B 1/22 138/30 |
| 6,622,755 | B2 * | 9/2003 | Weber | F15B 1/22 138/30 |
| 9,873,301 | B2 * | 1/2018 | Slusarczyk | F16F 9/061 |
| 10,400,843 | B2 * | 9/2019 | Yoshida | F16F 9/585 |
| 2004/0056530 | A1 * | 3/2004 | Yuda | F15B 1/103 303/DIG. 11 |
| 2012/0211111 | A1 * | 8/2012 | Baltes | F15B 1/103 138/30 |
| 2016/0169251 | A1 * | 6/2016 | Prouzet | F15B 1/04 92/36 |
| 2018/0066679 | A1 * | 3/2018 | Arikawa | F16F 9/096 |

FOREIGN PATENT DOCUMENTS

| | | |
|---|---|---|
| FR | 2563584 | 10/1985 |
| JP | 2002122101 | 4/2002 |
| JP | 2004183852 | 7/2004 |
| JP | 2007162834 | 6/2007 |
| WO | 2018207654 | 11/2018 |

* cited by examiner

WEIGHT OPTIMIZED BELLOW ACCUMULATOR

FIELD

The present disclosure relates to dampers and particularly to dampers with accumulators.

BACKGROUND

The statements in this section merely provide background information related to the present disclosure and may not constitute prior art.

Shock absorbers (also known as dampers or damper assemblies) for vehicles such as motorcycles, automobiles and trucks, among others, typically have a piston-cylinder assembly with a pressure tube containing oil and/or gas, and a piston with a piston rod disposed in the pressure tube. The pressure tube has one end connected to a cylinder mount with a bushing disposed therein and another end through which the piston rod extends. One end of the piston rod is connected to the piston and another end is connected to a piston rod mount with a bushing disposed therein. The cylinder mount is connected to a body or frame of the vehicle (also known as a "sprung mass") and the piston rod mount is connected to a suspension system of the vehicle (also known as an "unsprung mass"). In the alternative, the cylinder mount is connected to the unsprung mass of the vehicle and the piston rod is connected to the sprung mass of the vehicle.

During operation or use of the shock absorber, the piston and piston rod slide within the cylinder such that damping force is created by the restricted flow of a working fluid through passages in the piston-cylinder assembly. Also, some shock absorbers include remote accumulators to accommodate the flow of the working fluid. However, such remote accumulators increase the weight of shock absorbers.

The present disclosure addresses the issues of remote accumulators adding weight to shock absorbers among other issues related to shock absorbers with remote accumulators.

SUMMARY

This section provides a general summary of the disclosure and is not a comprehensive disclosure of its full scope or all of its features.

In one form of the present disclosure, a damper assembly includes a damper with a pressure tube and a piston slidably disposed within the pressure tube. A first working chamber is defined on one side of the piston and a second working chamber is defined on an opposite side of the piston such that a volume of the second working chamber decreases during a compression stroke of the piston and the volume of the second working chamber increases during a rebound stroke of the piston. A bellow accumulator assembly is included and in fluid communication with the second working chamber. The bellow accumulator assembly includes a housing, a bellow accumulator disposed within the housing, a pressurized gas chamber defined between the housing and the bellow accumulator and an accumulator chamber defined between the bellow accumulator and the second working chamber. Also, the bellow accumulator is configured to accommodate excess working fluid flowing out of the second working chamber during the compression stroke of the piston and provide working fluid to the second working chamber during the rebound stroke of the piston.

In some variations, the bellow accumulator has a bellow-shaped sidewall defining a cylinder and a concave-shaped closed end extending from the bellow-shaped sidewall. In at least one variation, the concave-shaped closed end extends into the cylinder defined by the bellow-shaped sidewall. And in some variations, the concave-shaped closed end is a paraboloid-shaped end extending from the bellow-shaped wall and into the cylinder defined by the bellow-shaped sidewall.

In at least one variation, the housing has a complimentary shape with the bellow accumulator. Also, the housing can have a concave-shaped end configured to nest within the concave-shaped closed end of the bellow accumulator.

In some variations, a remote valve assembly is included and disposed between the damper and the bellow accumulator assembly. In such variations the remote valve assembly can be configured to regulate flow of the working fluid between the damper and the bellow accumulator assembly, and the bellow accumulator assembly can be attached and sealed to the remote valve assembly and the remote valve assembly can be attached and sealed to the damper.

In at least one variation, the bellow accumulator assembly includes a base with a bore and the housing is at least partially disposed in the bore. The base is attached and sealed to the remote valve assembly and the housing is mechanically coupled and sealed to the base. In some variations, the bellow accumulator includes a first seal disposed between the base and the housing and a second seal disposed between the base and the bellow accumulator. Also, the bellow accumulator has a flange end and the second seal is disposed between the base and the flange end. In some variations, the bellow accumulator is a metal bellow accumulator welded to the base.

In at least one variation the damper assembly includes a reserve tube radially disposed around the pressure tube and a reserve tube chamber defined between the reserve tube and the pressure tube, wherein the first working chamber is in fluid communication with reserve tube chamber.

In another form of the present disclosure, a damper assembly includes a damper with a pressure tube and a piston slidably disposed within the pressure tube. A first working chamber is defined on one side of the piston and a second working chamber is defined on an opposite side of the piston such that a volume of the second working chamber decreases during a compression stroke of the piston and the volume of the second working chamber increases during a rebound stroke of the piston. A remote valve assembly is attached, sealed to and in fluid communication with the damper, and a bellow accumulator assembly is attached, sealed, and in fluid communication with the remote valve assembly. The bellow accumulator assembly includes a housing, a bellow accumulator disposed within the housing, a pressurized gas chamber defined between the housing and the bellow accumulator and an accumulator chamber defined between the bellow accumulator and the second working chamber. The bellow accumulator is configured to accommodate excess working fluid flowing out of the second working chamber during the compression stroke of the piston and provide working fluid to the second working chamber during the rebound stroke of the piston.

In some variations, the bellow accumulator includes a bellow-shaped sidewall defining a cylinder and a concave-shaped closed end extending from the bellow-shaped sidewall. And in at least one variation the housing comprises a complimentary concave-shaped end configured to nest within the concave-shaped closed end of the bellow accumulator.

In still another form of the present disclosure, a damper assembly includes a damper with a pressure tube and a piston slidably disposed within the pressure tube. A first working chamber is defined on one side of the piston and a second working chamber is defined on an opposite side of the piston such that a volume of the second working chamber decreases during a compression stroke of the piston and the volume of the second working chamber increases during a rebound stroke of the piston. A remote valve assembly is include and attached, sealed to and in fluid communication with the damper, and a bellow accumulator assembly is included attached, sealed, and in fluid communication with the remote valve assembly. The bellow accumulator assembly has a base with a bore, a housing disposed at least partially within the bore and a bellow accumulator disposed within the housing. A pressurized gas chamber is defined between the housing and the bellow accumulator and an accumulator chamber is defined between the bellow accumulator and the second working chamber. Also, the bellow accumulator is configured to accommodate excess working fluid flowing out of the second working chamber during the compression stroke of the piston and provide working fluid to the second working chamber during the rebound stroke of the piston. In some variations, a first seal disposed between the base and the housing and a second seal disposed between the base and the bellow accumulator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a damper with a weight enhanced bellow accumulator assembly (referred to herein simply as a "bellow accumulator assembly") that accommodates working fluid during compression and rebound strokes of the damper. The bellow accumulator assembly includes a bellow accumulator with a bellow- or accordion-shaped sidewall and a concave-shaped closed end such that the concave-shaped closed end extends between or within the bellow-shaped sidewall. The bellow accumulator is disposed in a complimentary shaped housing such that a gas pressurized chamber is defined between an outer surface of the bellow accumulator and an inner surface of the complimentary shaped housing, and an accumulation chamber is defined between an inner surface of the bellow accumulator and a remote valve assembly in fluid communication with the bellow accumulator. The bellow-shaped sidewall allows the concave-shaped end to move in one direction and thereby accept working fluid into the bellow accumulator and move in an opposite direction as working fluid flows out of the bellow accumulator. Also, the bellow accumulator can be made from a thin material (e.g., metal sheet or foil), and in combination with the complimentary shaped housing, the bellow accumulator assembly is lightweight and accommodates working fluid without the use of moving parts.

Figure 1:
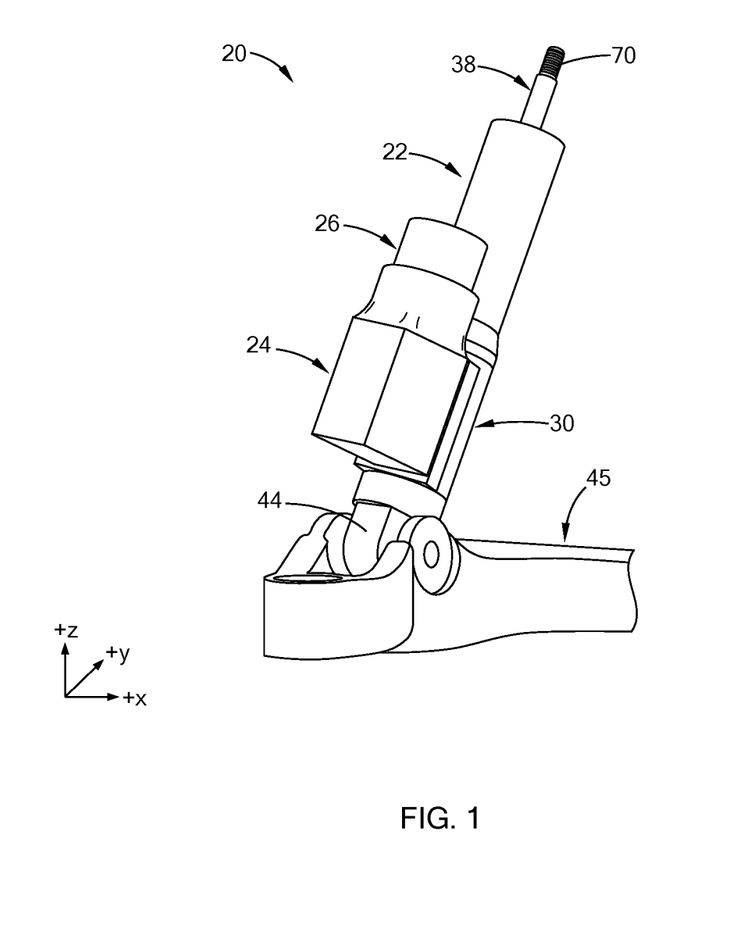
FIG. 1 is a perspective view of a damper assembly with a weight enhanced bellow accumulator according to the teachings of the present disclosure.
Figure 2:
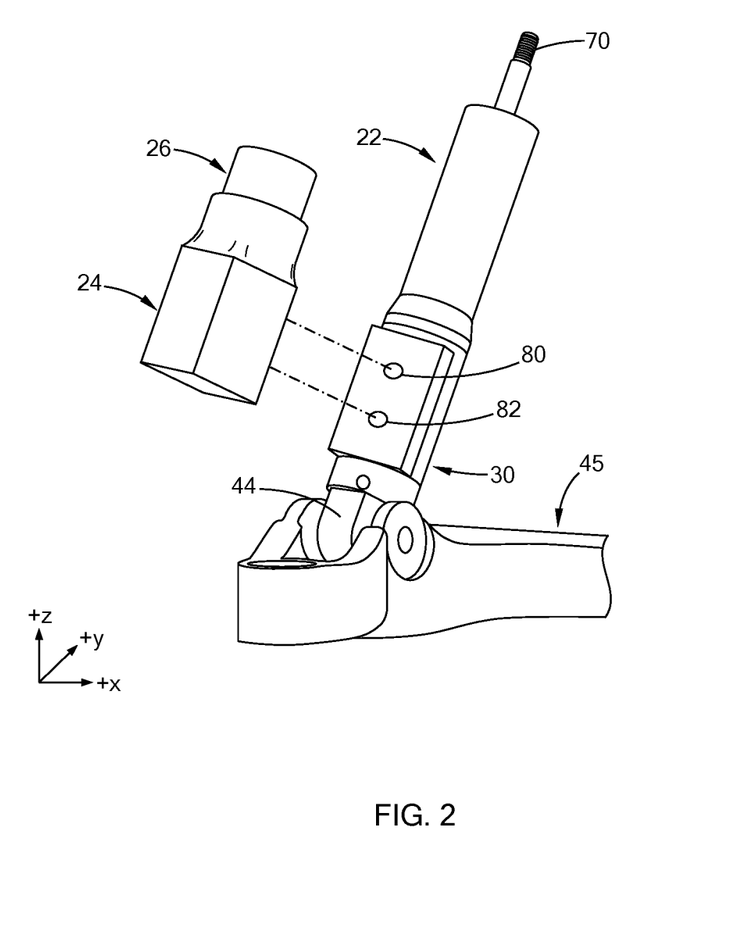
FIG. 2 is an exploded perspective view of the damper assembly of FIG. 1.

Referring now to FIGS. 1 and 2, a damper assembly 20 with a damper 22, a remote valve assembly 24, and a bellow accumulator assembly 26 is shown. The remote valve assembly 24 is mechanically coupled to a damper body 30 and in fluid communication with the damper 22 via a first damper port 80 and a second damper port 82. Also, the bellow accumulator assembly 26 is mechanically coupled to and in fluid communication with the remote valve assembly 24 (and the damper 22) as described in greater detail below. As shown in FIG. 1, the damper assembly 20 includes an attachment feature 44 configured to mechanically couple the damper 22 to a first component 45 of a vehicle (not shown) and a piston rod 38 with an upper end 70 configured to be mechanically coupled to a second component (not shown) of the vehicle. In one configuration, the first component 45 is a sprung component of the vehicle and the second component is an unsprung component of the vehicle. In another configuration, the first component 45 is an unsprung component of the vehicle and the second component is a sprung component of the vehicle. In the example provided, the damper assembly 20 is a vehicle shock, though a person of skill in the art will appreciate that the teachings of the present disclosure can also be applied to other damper assemblies including, but not limited to, vehicle struts.

Figure 3:
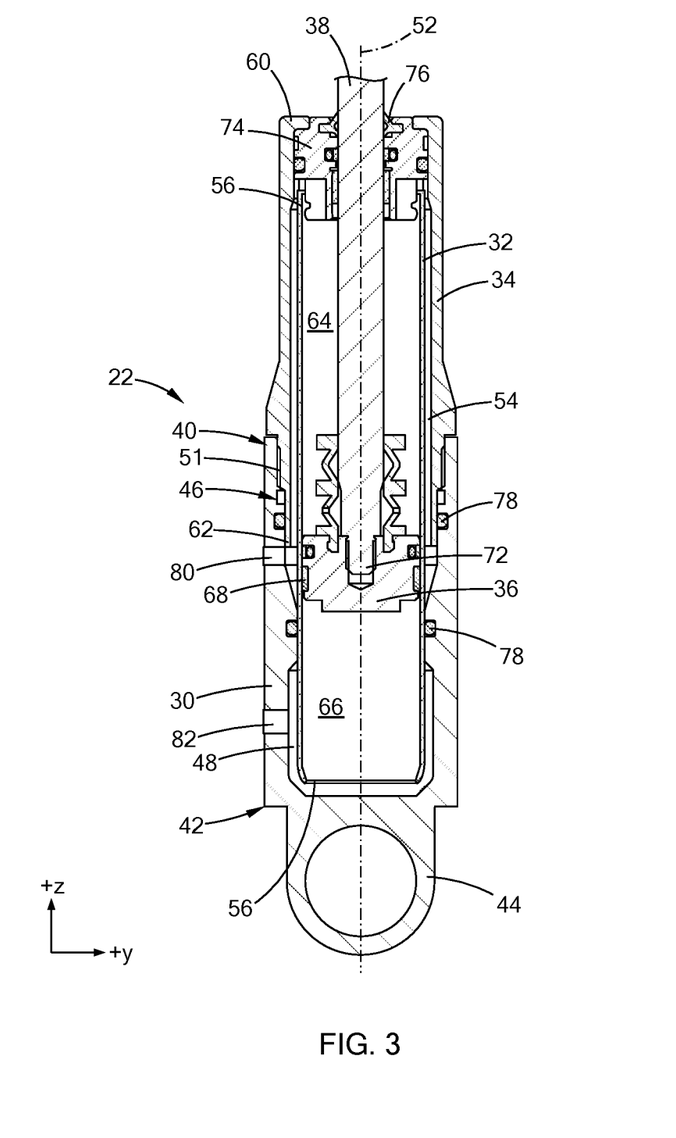
FIG. 3 is a side cross-sectional view of a damper of the damper assembly in FIG. 1.
Figure 4:
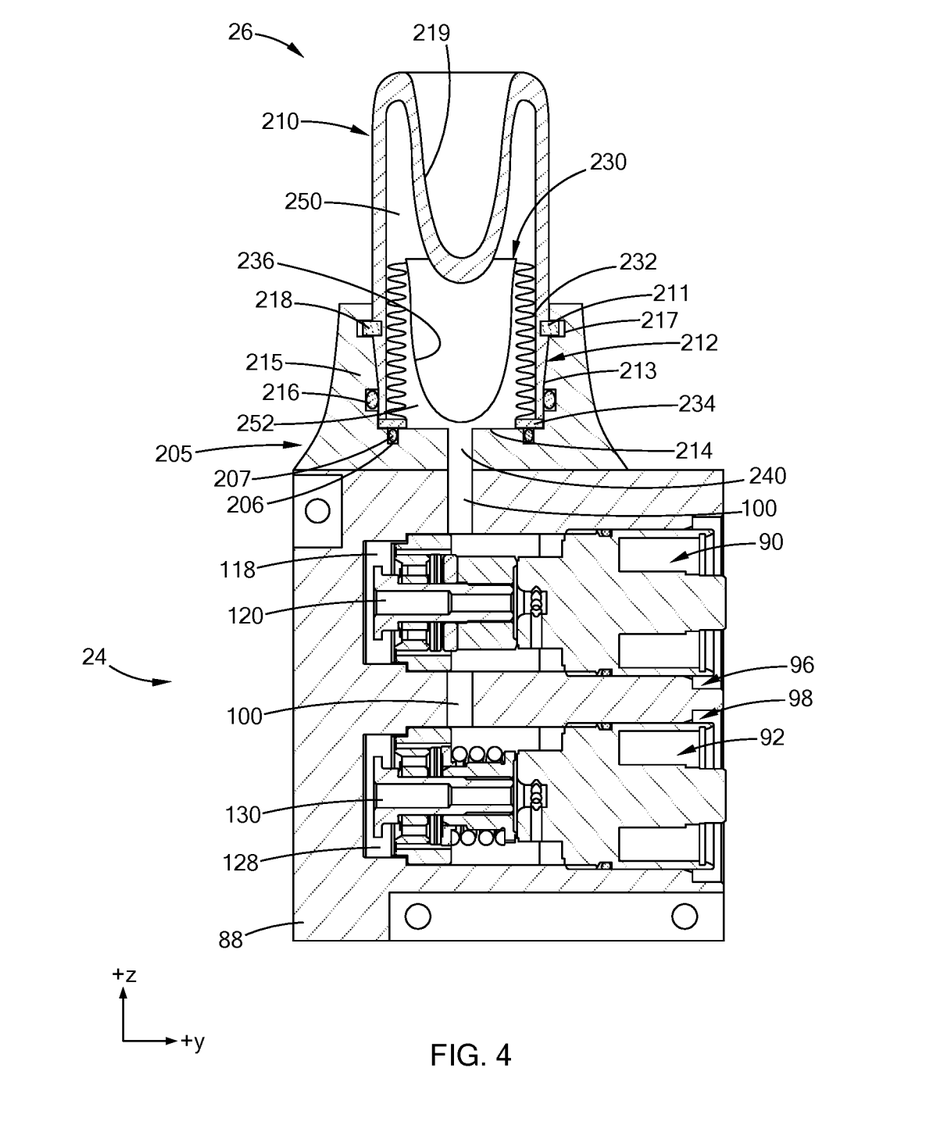
FIG. 4 is a side cross-sectional view of a remote valve assembly with the weight enhanced bellow accumulator of FIG. 1 and with the weight optimized bellow accumulator in a contracted state.
Figure 5:
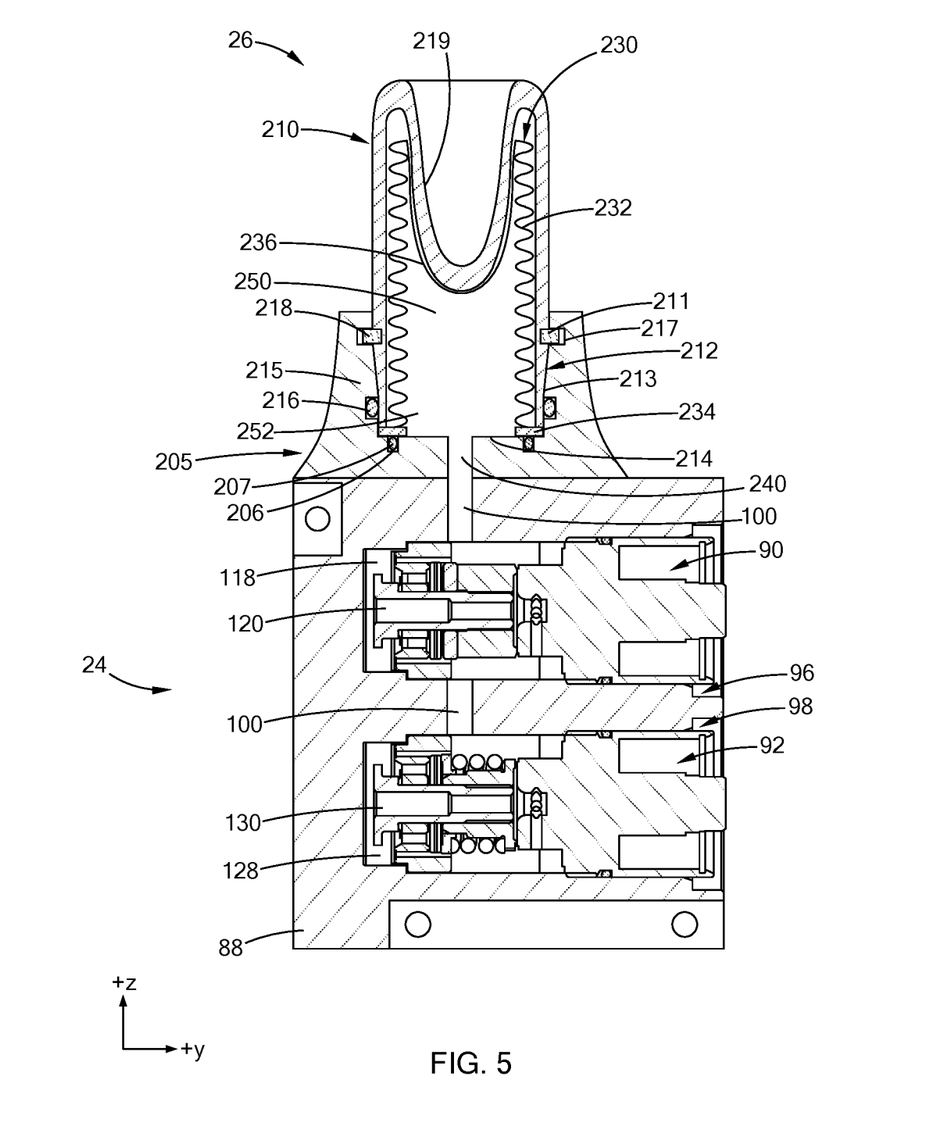
FIG. 5 is a side cross-sectional view of the remote valve assembly and weight enhanced bellow accumulator of FIG. 3 with the weight optimized bellow accumulator in an expanded state.

Referring to FIGS. 3-5, a cross-sectional view of the damper 22 is shown in FIG. 3 and a cross-sectional view of the remote valve assembly 24 and the bellow accumulator assembly 26 is shown in FIGS. 4 and 5. The damper 22 includes the damper body 30, a pressure tube 32, a reserve tube 34, a piston 36, and the piston rod 38. The damper body 30 extends between an upper (+z direction) end 40 and a lower (−z direction) end 42 along a longitudinal axis 52 of the damper 22, the pressure tube 32 extends between an upper end 56 and a lower end 58 (along the longitudinal axis 52), and the reserve tube 34 between an upper end 60 and a lower end 62 (along the longitudinal axis 52).

In some variations of the present disclosure, the lower end 42 of the damper body 30 includes the attachment feature 44 and in at least one variation the damper body 30 has an inner stepped bore 46 between the upper end 40 and the lower end 42. In such variations, the inner stepped bore includes a lower enlarged section 48, an upper enlarged section 50, and a reserve tube engagement section 51. Also, the reserve tube 34 extends about the pressure tube 32 such that a reserve tube chamber 54 is defined radially between the pressure tube 32 and the reserve tube 34.

The piston 36 is disposed within and in sliding engagement with the pressure tube 32, and a first working chamber 64 is defined above (+z direction) the piston 36 and a second working chamber 66 is defined below (−z direction) the piston 36. In some variations, and as shown in FIG. 3, the piston 36 is a closed piston 36 without passageways for fluid communication between the first working chamber 64 and the second working chamber 66. In other variations, the piston 36 is an open piston with passageways (not shown) for fluid communication between the first working chamber 64 and the second working chamber 66. A piston seal 68 can be included and disposed between the piston 36 and the pressure tube 32 such that fluid communication between the first working chamber 64 and the second working chamber 66 is inhibited and/or sliding movement of the piston 36 within the pressure tube 32 without undesired friction is enhanced.

The piston rod 38 extends along the longitudinal axis 52 between the upper end 70 (+z direction) and a lower end 72 (−z direction) that is attached or coupled to the piston 36. The piston rod 38 extends through the first working chamber 64 and a rod guide assembly 74. In some variations the piston rod 38 extends through a seal assembly 76 disposed within or on the rod guide assembly 74. The rod guide assembly 74 is disposed within and coupled to the upper end 60 of the reserve tube 34 and the upper end 56 of the pressure tube 32. Accordingly, the first working chamber 64 is bounded by or between the pressure tube 32, the piston 36, and the rod assembly 74. In addition, the second working chamber 66 is bounded by or between the pressure tube 32, the piston 36, and the lower end 58 of the pressure tube 32.

The pressure tube 32 is disposed within and co-axial with the reserve tube 34 such that the lower end 58 of the pressure tube 32 is positioned or located beyond or lower (−z direction) than the lower end 62 of the reserve tube 34. Also, the lower end 58 of the pressure tube 32 is received or located within the lower enlarged section 48 of the damper body 30 and the lower end 62 of the reserve tube is received or located within the upper enlarged section 50 of the damper body 30. Accordingly, the lower enlarged section 48 of the damper body 30 is in fluid communication with the second working chamber 66 and the upper enlarged section of the damper body 30 is in fluid communication with the reserve tube chamber 54. In some variations, O-ring seals 78 are disposed between the reserve tube 34 and the damper body 30 and/or between the pressure tube 32 and the damper body 30. Also, the first damper port 80 and the second damper port 82 extend through the damper body 30 such that the first damper port 80 is in fluid communication with the lower enlarged section 48 and the second damper port 82 is in fluid communication with the upper enlarged section 50. Accordingly, the first damper port 80 is in fluid communication with the second working chamber 66 and the second damper port 82 is in fluid communication with the reserve tube chamber 54.

Referring particularly to FIGS. 4 and 5, the remote valve assembly 24 includes a valve block 88 with a first valve bore 96 and a second valve bore 98. A first valve 90 (e.g., a first electromagnetic valve) is disposed in the first valve bore 96 and a second valve 92 (e.g., a second electromagnetic valve) is disposed in the second valve bore 98. In some variations, the valve block includes a passageway 100 extending between the second valve bore 98 and the first valve bore 96, and between the first valve bore 96 and the bellow accumulator assembly 26. In addition, the first damper port 80 (FIG. 2) of the damper body 30 is in fluid communication with the first valve bore 96 and the second damper port 82 (FIG. 2) is in fluid communication with the second valve bore 98.

The bellow accumulator assembly 26 includes a base 205 and a housing 210 attached to or coupled to the base 205. In some variations, the base includes a bore 212 and at least a portion of the housing 210 is disposed within the bore 212. In such variations the bore 212 includes a sidewall 213 and a bore base 214. And in at least one variation, the sidewall 213 has a first seal groove 215 and a first seal 216 (e.g., an O-ring seal) is disposed within the first seal groove 215 to enhance or ensure a liquid and/or air tight seal between the base 205 and the housing 210. In some variations the sidewall includes a lock ring groove 217, the housing 210 includes a complimentary lock ring groove 211, and a lock ring 218 is disposed within the lock ring grooves 211, 217 such that the housing 210 is mechanically coupled to the base 205.

Disposed within the housing 210 is a bellow accumulator 230 with a sidewall 232, an open end 234, and a closed end 236. In some variations of the present disclosure, the sidewall 232 is a bellow-shaped or accordion-shaped sidewall 232, the open end 234 is a flange end 234, and the closed end 236 is a concave-shaped closed end 236. In at least one variation the closed end 236 is a paraboloid-shaped closed end 236. Non-limiting examples of materials from which the bellow accumulator is formed include commercially pure metals (e.g., iron, nickel, copper, aluminum, titanium, among others), alloys (steels, stainless steels, nickel alloys, copper alloys, aluminum alloys, titanium alloys, among others), and polymers. The housing 210 is complimentary shaped with the bellow accumulator and has a complimentary shaped end 219, e.g., a concave-shaped end 219 and/or a paraboloid-shaped end 219. In some variations, the base 205 also includes a second seal groove 206 and a second seal 207 (e.g., an O-ring seal) is disposed within the second seal groove 206 to enhance or ensure a liquid and/or air tight seal between the bellow accumulator 230 and the base 205 (i.e. between the open end 234 and the bore base 214.

The bellow accumulator 230 divides the housing 210 into a pressurized gas chamber 250 and an accumulation chamber 252 that is arranged in fluid communication with the common valve passageway 100 via a port or opening 240 extending through the base 205. Non-limiting examples of gas in the pressurized gas chamber 250 are air and nitrogen, among others. It should be understood that when working fluid flows into the accumulation chamber 252 the volume of the accumulation chamber 252 increases and the volume of the pressurized gas chamber 250 decreases (compare FIG. 5 with FIG. 4), and when fluid flows out of the accumulation chamber 252 the volume of the accumulation chamber 252 decreases and the volume of the pressurized gas chamber 250 increases (compare FIG. 4 with FIG. 5).

Referring back to FIG. 3, the piston rod 38 extends only into and through the first working chamber 64. Accordingly, extension (+z direction) and compression (−z direction)

movement of the piston 36 within the pressure tube 32 results in a different amount of working fluid displaced in the first working chamber 64 compared to the amount of working fluid displaced in the second working chamber 66. Also, the difference between the amount of working fluid displaced in the first working chamber 64 and the second working chamber 66 is known as and referred to herein as the "rod volume", and the rod volume must be and is accommodated for during compression and extension strokes of the piston 36 within the pressure tube 32.

For example, during a compression stroke, the piston 36 (FIG. 3) moves towards the lower end 58 of the pressure tube 32 and thereby increases the volume of the first working chamber 64 and decreases the volume of the second working chamber 66. And the volume decrease (i.e., the absolute value of the volume decrease) of the second working chamber 66 is equal to the volume increase of the first working chamber 64 plus the rod volume. Accordingly, the damper assembly 20 accommodates the net volume reduction in the pressure tube 32 and the corresponding excess working fluid by flowing the working fluid out of the damper 22, through the remote valve assembly 24 and into the bellow accumulator assembly 26 as explained in greater detail below. And during an extension stroke the piston 36 moves towards the upper end 56 of the pressure tube 32 and thereby decreases the volume of the first working chamber 64 and increases the volume of the second working chamber 66. The increase in volume of the second working chamber 66 is equal to the volume decrease (i.e., the absolute value of the volume decrease) of the first working chamber 64 plus the rod volume. Accordingly, the damper assembly 20 accommodates the net volume increase in the pressure tube 32 and the corresponding need for working fluid by flowing the working fluid from the bellow accumulator assembly 26, through the remote valve assembly 24 and into the damper 22 as explained in greater detail below.

Regarding the compression stroke of the piston 36 and the net volume reduction in the pressure tube 32, working fluid in the second working chamber 66 flows into the lower enlarged section 48, through the second damper port 82, into a second transfer chamber 128 of the remote valve assembly 24, and into the common valve passageway 100 via a second active orifice 130 in the second valve 92. And working fluid in the common valve passageway 100 flows through the port 240 of the base 205 and into the accumulation chamber 252. It should be understood that although there is a net volume reduction in the pressure tube 32, the first working chamber 64 still increases in volume during the compression stroke. Accordingly, this increase in volume is accommodated by working fluid in a first transfer chamber 118 of the remote valve assembly 24 flowing through a first active orifice 120, through the first damper port 80, into the reserve tube chamber 54, and into the first working chamber 64 via the openings or slots in the rod guide assembly 74.

As the working fluid flows into the accumulation chamber 252, the bellow accumulator 230 expands, i.e., the closed end 236 moves upwardly (+z direction) and the sidewall 232 expands or elongates within the housing 210. Depending on the length of compression stroke, and thus the amount of excess working fluid to be accommodated by the bellow accumulator assembly 26, the closed end 236 moves to a position between a contracted position shown in FIG. 4 and a fulling expanded position shown in FIG. 5. In addition, and as shown in FIG. 5, the closed end 236 has a complimentary shape with the end 219 of the housing 210 such that the closed end 236 is nested within the end 219 of the housing 210. Accordingly, the bellow accumulator assembly 26 has a reduced weight compared to traditional accumulators and movement of the closed end 236 occurring via expansion and contraction of the sidewall 232 provides an accumulator with no moving parts and enhanced reliability.

Regarding the rebound or extension stroke of the piston 36 and the net volume increase in the pressure tube 32, working fluid in the accumulation chamber 252 flows through the port 240, through the common valve passageway 100, and into the second transfer chamber 128 via the second active orifice 130 in the second valve 92. And working fluid in the second transfer chamber 128 flows through the second damper port 82, into the lower enlarged section 48 and into the second working chamber 66. It should be understood that although there is a net volume increase in the pressure tube 32, the first working chamber 64 still decreases in volume during the rebound stroke. Accordingly this decrease in volume is accommodated by working fluid from the first working chamber 64 flowing into the reserve tube chamber 54 via the openings or slots in the rod guide assembly 74, and through the first damper port 80 into the first transfer chamber 118 via the first active orifice 120 of the remote valve assembly 24.

As the working fluid flows out of the accumulation chamber 252, the bellow accumulator 230 contracts, i.e., the closed end 236 moves downwardly (−z direction) and the sidewall 232 contracts within the housing 210. Depending on the length of the rebound stroke and the amount of working fluid in the accumulation chamber 252 at the beginning or start of the rebound stroke, the closed end 236 moves to a position between the fulling expanded position shown in FIG. 5 and the contracted position shown in FIG. 4.

When an element or layer is referred to as being "on," "engaged to," "connected to" or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A damper assembly comprising:
    a damper with a pressure tube and a piston slidably disposed within the pressure tube, wherein a first working chamber is defined on one side of the piston, a second working chamber is defined on an opposite side of the piston such that a volume of the second working chamber decreases during a compression stroke of the piston and the volume of the second working chamber increases during a rebound stroke of the piston; and
    a bellow accumulator assembly in fluid communication with the second working chamber, the bellow accumulator assembly comprising a housing, a bellow accumulator disposed within the housing, a pressurized gas chamber defined between the housing and the bellow accumulator and an accumulator chamber defined between the bellow accumulator and the second working chamber, wherein the bellow accumulator is configured to accept excess working fluid flowing out of the second working chamber during the compression stroke of the piston and provide working fluid to the second working chamber during the rebound stroke of the piston,
    wherein the bellow accumulator comprises a bellow-shaped sidewall defining a cylinder and a concave-shaped closed end extending from the bellow-shaped sidewall,
    wherein the housing comprises a concave-shaped end that has a complimentary shape with the bellow accumulator and is configured to nest within the concave-shaped closed end of the bellow accumulator.

2. The damper assembly according to claim 1, wherein the concave-shaped closed end extends into the cylinder defined by the bellow-shaped sidewall.

3. The damper assembly according to claim 2, wherein the concave-shaped closed end is a paraboloid-shaped end extending from the bellow-shaped sidewall and into the cylinder defined by the bellow-shaped sidewall.

4. The damper assembly according to claim 1 further comprising a remote valve assembly disposed between the damper and the bellow accumulator assembly, wherein the remote valve assembly is configured to regulate flow of working fluid between the damper and the bellow accumulator assembly.

5. The damper assembly according to claim 4, wherein the bellow accumulator assembly is attached and sealed to the remote valve assembly and the remote valve assembly is attached and sealed to the damper.

6. The damper assembly according to claim 5, wherein the bellow accumulator assembly further comprises a base with a bore and the housing is at least partially disposed in the bore.

7. The damper assembly according to claim 6, wherein the base is attached and sealed to the remote valve assembly.

8. The damper assembly according to claim 7, wherein the housing is mechanically coupled and sealed to the base.

9. The damper assembly according to claim 8 further comprising a first seal disposed between the base and the housing and a second seal disposed between the base and the bellow accumulator.

10. The damper assembly according to claim 9, wherein the bellow accumulator comprises a flange end and the second seal is disposed between the base and the flange end.

11. The damper assembly according to claim 6, wherein the bellow accumulator is a metal bellow accumulator welded to the base.

12. The damper according to claim 1 further comprising a reserve tube radially disposed around the pressure tube and a reserve tube chamber defined between the reserve tube and the pressure tube, wherein the first working chamber is in fluid communication with reserve tube chamber.

13. A damper assembly comprising:
    a damper with a pressure tube and a piston slidably disposed within the pressure tube, wherein a first working chamber is defined on one side of the piston, a second working chamber is defined on an opposite side of the piston such that a volume of the second working chamber decreases during a compression stroke of the piston and the volume of the second working chamber increases during a rebound stroke of the piston;
    a remote valve assembly attached, sealed to and in fluid communication with the damper; and a bellow accumulator assembly attached, sealed, and in fluid communication with the remote valve assembly, the bellow accumulator assembly comprising a housing, a bellow accumulator disposed within the housing, a pressurized gas chamber defined between the housing and the bellow accumulator and an accumulator chamber defined between the bellow accumulator and the second working chamber, wherein the bellow accumulator is configured to accept excess working fluid flowing out of the second working chamber during the compression stroke of the piston and provide working fluid to the second working chamber during the rebound stroke of the piston, wherein the bellow accumulator comprises a bellow-shaped sidewall defining a cylinder and a concave-shaped closed end extending from the bellow-shaped sidewall, wherein the housing comprises a concave-shaped end that has a complimentary shape with the bellow accumulator and is configured to nest within the concave-shaped closed end of the bellow accumulator.

14. The damper assembly according to claim 13, wherein the bellow accumulator includes a base with a bore, wherein the housing is disposed at least partially within the bore.

15. The damper assembly according to claim 14 further comprising a first seal disposed between the base and the housing and a second seal disposed between the base and the bellow accumulator.

16. A damper assembly comprising:

a damper with a pressure tube and a piston slidably disposed within the pressure tube, wherein a first working chamber is defined on one side of the piston, a second working chamber is defined on an opposite side of the piston such that a volume of the second working chamber decreases during a compression stroke of the piston and the volume of the second working chamber increases during a rebound stroke of the piston;

a bellow accumulator assembly in fluid communication with the second working chamber, the bellow accumulator assembly comprising a housing, a bellow accumulator disposed within the housing, a pressurized gas chamber defined between the housing and the bellow accumulator and an accumulator chamber defined between the bellow accumulator and the second working chamber, wherein the bellow accumulator is configured to accept excess working fluid flowing out of the second working chamber during the compression stroke of the piston and provide working fluid to the second working chamber during the rebound stroke of the piston; and a remote valve assembly disposed between the damper and the bellow accumulator assembly, wherein the remote valve assembly is configured to regulate flow of working fluid between the damper and the bellow accumulator assembly, wherein the bellow accumulator assembly is attached and sealed to the remote valve assembly and the remote valve assembly is attached and sealed to the damper, wherein the bellow accumulator assembly further comprises a base with a bore and the housing is at least partially disposed in the bore, wherein the base is attached and sealed to the remote valve assembly, wherein the housing is mechanically coupled and sealed to the base, wherein the damper assembly further comprises a first seal disposed between the base and the housing and a second seal disposed between the base and the bellow accumulator, and wherein the bellow accumulator comprises a flange end and the second seal is disposed between the base and the flange end.

* * * * *